United States Patent [19]
Hook et al.

[11] Patent Number: 5,680,459
[45] Date of Patent: Oct. 21, 1997

[54] PASSIVE TRANSPONDER

[75] Inventors: Christopher Hook, Reading; Keith Juson, Malmesburg; Chris Hall, London, all of England; Donald Harold Ferguson, Maple, Canada; Dimitrie Octavian Paun, Mississauga, Canada; Alexandru Oprea, Willowdale, Canada

[73] Assignee: Kasten Chase Applied Research Limited, Mississauga, Canada

[21] Appl. No.: 430,825

[22] Filed: Apr. 28, 1995

[30] Foreign Application Priority Data

Apr. 29, 1994 [GB] United Kingdom .................... 9408588

[51] Int. Cl.⁶ ...................................................... H04K 1/00
[52] U.S. Cl. ............................................... 380/23; 380/49
[58] Field of Search .......................................... 380/23, 49

[56] References Cited

U.S. PATENT DOCUMENTS 4,598,275  7/1986  Ross et al. ........................... 340/573

FOREIGN PATENT DOCUMENTS

| | | |
|---|---|---|
| 0 420 295 A1 | 3/1986 | European Pat. Off. . |
| 0 537 378 A1 | 10/1991 | European Pat. Off. . |
| 0 578 457 A2 | 7/1992 | European Pat. Off. . |
| 0 502 518 A2 | 9/1992 | European Pat. Off. . |
| 2 607 946 A1 | 6/1988 | France . |
| 2163324 | 2/1986 | United Kingdom . |
| WO88/04453 | 6/1988 | WIPO . |
| WP90/09707 | 8/1990 | WIPO . |
| WO91/17515 | 11/1991 | WIPO . |

*Primary Examiner*—David C. Cain
*Attorney, Agent, or Firm*—Fay, Sharpe, Beall, Fagan, Minnich & McKee

[57] ABSTRACT

The present invention relates to an electronic identification system comprising one or more transponders which store identification and other information in memory, and readers, which capture information from the transponders and write new information thereto, and in which communications between transponders and readers are accomplished using radio frequency signals. The present invention has attributes which make it particularly useful in automatic fare collection systems, where transponders, typically in the form of thin cards and used as pre-paid tickets, are carried by fare paying passengers to replace printed tickets and eliminate exchange of cash. Specifically the system achieves simultaneous identification of numerous transponders by one reader, permits a reader to selectively program any of many transponders under its control, exhibits fast transaction speed to maximize passenger throughput, and achieves exceptional data storage integrity.

10 Claims, 6 Drawing Sheets

PASSIVE TRANSPONDER

FIELD OF THE INVENTION

The present invention relates generally to radio frequency transponder systems, in which there are a multitude of transponders and readers. More particularly, the invention relates to such systems wherein each transponder essentially comprises circuitry for radio communications and a control circuit in the form of a silicon integrated circuit (IC), in which identification information and variable data is stored, for use in automatic fare collection (AFC) systems, and wherein each fare-paying passenger is issued with such a transponder, typically in the form of a thin plastic card, similar to a familiar credit or debit card.

BACKGROUND OF THE INVENTION

There are many transponder systems commonly available which use a variety of techniques to achieve identification. However, such prior art transponder systems suffer from a number of deficiencies which make them unsuitable for use in AFC systems.

As far as is known by the inventors named in this application, there is no prior art passive (field-powered) system which achieves simultaneous identification of numerous transponders by one reader, making it impossible in the prior art to satisfactorily handle a situation where more than one transponder is presented to a reader at one time, either accidentally or deliberately. For example, PCT/AU90/00043 (Turner, et al) describes an identification system which employs transponders that maybe field-powered (passive) or self-powered (active), in which a plurality of transponders may clearly be present near a reader, yet the system can only achieve error-free identification when just one transponder is under its influence and therefore this system is deficient when applied to AFC systems and other applications where many transponders may be under the simultaneous influence of one reader.

Active (self-powered) transponders systems are also known in the art, such as co-pending patent application POT/CA91/00147 filed in the name of the same assignee as the present application, which describes an innovative mechanism by which superior simultaneous identification performance is achieved. However, active transponders are unsuitable in AFC systems because of a number of factors, such as: limited operating life due to use of an exhaustible power source in the form of an encapsulated cell; transponder thickness which is limited by the thickness of the power cell; and added cost of the cell.

No prior art system is known to the inventors named herein which permits the reader to selectively write information to any of many transponders under its control, an essential corollary after achieving simultaneous identification. For example, PCT/US87/00466 (Froelich, et al) describes a transponder which employs photoelectric transducers for data communications. There is no consideration given in this reference to the need to selectively programme one of many transponders since this prior art system requires line of sight between the reader and each transponder.

Prior art passive (field-powered) transponder systems are also known which feature re-programmability of data via a radio link. However, such systems operate at programming rates which are unacceptably slow in AFC systems. High speed transfer of data from the reader to the non-volatile memory in the transponder is essential in AFC systems in order to minimise the duration of a "transaction "— a "transaction" in this context is defined as the sequence of identifying the transponder, reading some information from an area of the transponder's data memory and then writing some new information back to the transponder for storage in its memory—, which in turn relates to the ability of the AFC system to achieve the desired high throughput of passengers each carrying a transponder for fare payment.

For example, GB 2163324 A (Electromatic) describes a field-powered transponder which may have a re-programmable memory. Information for storage therein is presented sequentially to the transponder by a reader using an elementary communications protocol, and the transponder requires time to commit each received data element to its non-volatile memory before it can accept a further data element for storage therein. In this example prior art system, the non-volatile memory is fabricated using electrically erasable and programmable read-only memory (EEPROM or $E^2PROM$) which is characterised by requiring approximately 10 ms to perform an erase/write cycle, which is the mechanism by which new data is written into the non-volatile storage array. This sequential process is time-consuming, and since in a typical APC transaction numerous packets of date are required to be written, this results in an unacceptably long transaction time.

SUMMARY OF THE INVENTION

The present invention addresses all of the above mentioned deficiencies observed in prior art systems, and further exhibits some additional inventive steps which in combination serve to provide an ingenious and advanced passive transponder which is particularly well suited to use in AFC systems.

Simultaneous identification of numerous transponders by one reader is achieved using the same techniques as those disclosed in co-pending application PCT/CA91/00147. To summarize, shortly after experiencing an excitation signal from a reader, the transponder sends an identification message. Without further action from the reader, the transponder sends further identification messages which are separated in time by a randomly varying interval, and that interval is an integer multiple of the time taken to transmit a single identification message. The interval between successive identification messages from a particular transponder is derived from a pseudo-random sequence generator, and the generators in different transponders are not synchronised. Hence, the various transponders submit respective identification messages in different time slots. An enhancement to this prior art technique is described in detail in the body of this specification, and forms an aspect of the present invention.

"Selective programming" is a term which is used to describe the mechanism by which a reader can write data to a nominated transponder privately and without interference from other transponders or confusion over the intended destination (ie. identity of the recipient transponder). This is achieved in the system of the present invention by giving every transponder a unique serial number which is used in defining the intended recipient of a particular data message packet transmitted by a reader. In this way a reader can be in control of numerous transponders simultaneously, each of whose identities is known to the reader through the simultaneous identification mechanism herein described. The reader can thus transmit a packet of data or instruction to a particular transponder by including the serial number of the destination transponder as an essential element of the communications protocol employed between the reader and transponders.

The speed of transfer of data from a reader to the non-volatile memory of a transponder is maximised in the system of the present invention by presenting a packet of data for storage rather than a number of elements (bits or bytes, for example) sequentially, which in turn acts to minimise the time needed to perform a transaction as previously defined herein. Prior art systems such as that disclosed in GB 2163324 A (Electromatic), suggest the possibility of storing information in a programmable memory (an E²PROM, for example) which may be achieved by a contact or non-contact programming means, but no consideration is given to the need to store a substantial amount of information quickly. Rather, the programming process as described in this prior art system is a tedious bit-by-bit process. In order to address this deficiency of prior art systems, the transponder in the system of the present invention arranges a serially received message packet from a reader so as to present it in parallel to the specially structured non-volatile memory array for simultaneous storage therein. Hence, the transponder of the present invention commits a multitude of bytes (1 byte equals 8 bits) to the non-volatile memory in the same time that a prior art "bit-by-bit" sequential system presents at most just one byte, resulting in a dramatic reduction over the prior art in the time taken to perform a transaction.

Additional aspects of the present invention which illustrate further inventive steps over prior art systems are described in the Description of a Preferred Embodiment, below, and may be summarised thus:

According to the present invention, the communications protocol which supports bidirectional transfer of messages between transponders and readers has been carefully designed to minimise data communications time and thus reduce the critical element of transaction time for the system.

The transponder of the present invention is equipped with circuitry that allows it to make an autonomous assessment of the amount of energy available from the excitation field generated by a reader, which, in field-powered transponder, is the transponder's only source of power for operation, this being power that it must also use to perform storage of data in the non-volatile memory. At various times during its operation, the transponder makes an assessment of the available energy extracted from the excitation field and returns a status flag in a message to the reader to indicate whether there is sufficient energy to perform a programming operation. Prior art systems such as that described in GB 2163324 A (Electromatic) teach the use of an energy level sensing circuit to determine when there is sufficient energy available from the excitation field for correct operation in a primary identification mode. However, there is no suggestion in the prior art of important energy assessment measurement performed by the present invention, which is conducted with the specific purpose of determining whether it is viable to commence a programming operation.

In combination with the energy assessment technique, a further characteristic of the present invention is the provision of means for determining, if a programming operation is commenced, whether or not the operation can be completed if the power source is suddenly removed immediately after the transponder commences a programming cycle. This technique is referred to herein as "programming outcome prediction", and overcomes the critical problem suffered by prior art systems of partial data storage caused by loss of power during a programming cycle.

In a preferred embodiment of the present invention, a reader sends information to transponders by applying a modulating signal to the carrier signal which creates an amplitude shift keyed (ASK) carrier envelops. This simple technique is used to permit the design of an elementary amplitude demodulater circuit in the transponder. But this simplicity has an accompanying disadvantage in that the dynamic range of a simple demodulater circuit can act to restrict the range of satisfactory operating distance between the reader transmission antenna and the transponder. Hence, according to an additional novel aspect of the present invention, an automatic gain control (AGC) circuit is provided which acts to progressively reduce the quality factor (Q) of the field detector circuit thereby limiting the amount of carrier signal delivered to the rectifier circuit within the transponder's control circuit. This in turn increases the dynamic range of the demodulator circuit and hence the range of distance over which the transponder can operate satisfactorily.

A further aspect of the present invention is the use of a technique termed herein as "transmission hold-off". It will be shown in the following description that the transponder is inherently capable of detecting the presence of other transponders in an excitation field, and can make use of this information to defer starting a message transmission when it first experiences an excitation signal generated by a reader. This transmission hold-off technique acts to further improve the simultaneous identification performance of the system.

A yet further novel aspect of the present invention is the logical separation between the functions of memory elements associated with identification (ie the serial number of the transponder) and the read/write data memory, which is only ever accessed when there is a need to read or write data from or to the memory array. This has the distinct advantage that the control circuit in the transponder can be designed to minimise dynamic current consumption during the identification cycle, thereby increasing the maximum possible range over which the transponder may be identified.

BRIEF DESCRIPTION OF THE DRAWINGS

A preferred embodiment of the present invention is described herein below with reference to the accompanying figures.

DESCRIPTION OF A PREFERRED EMBODIMENT

Figure 1A:
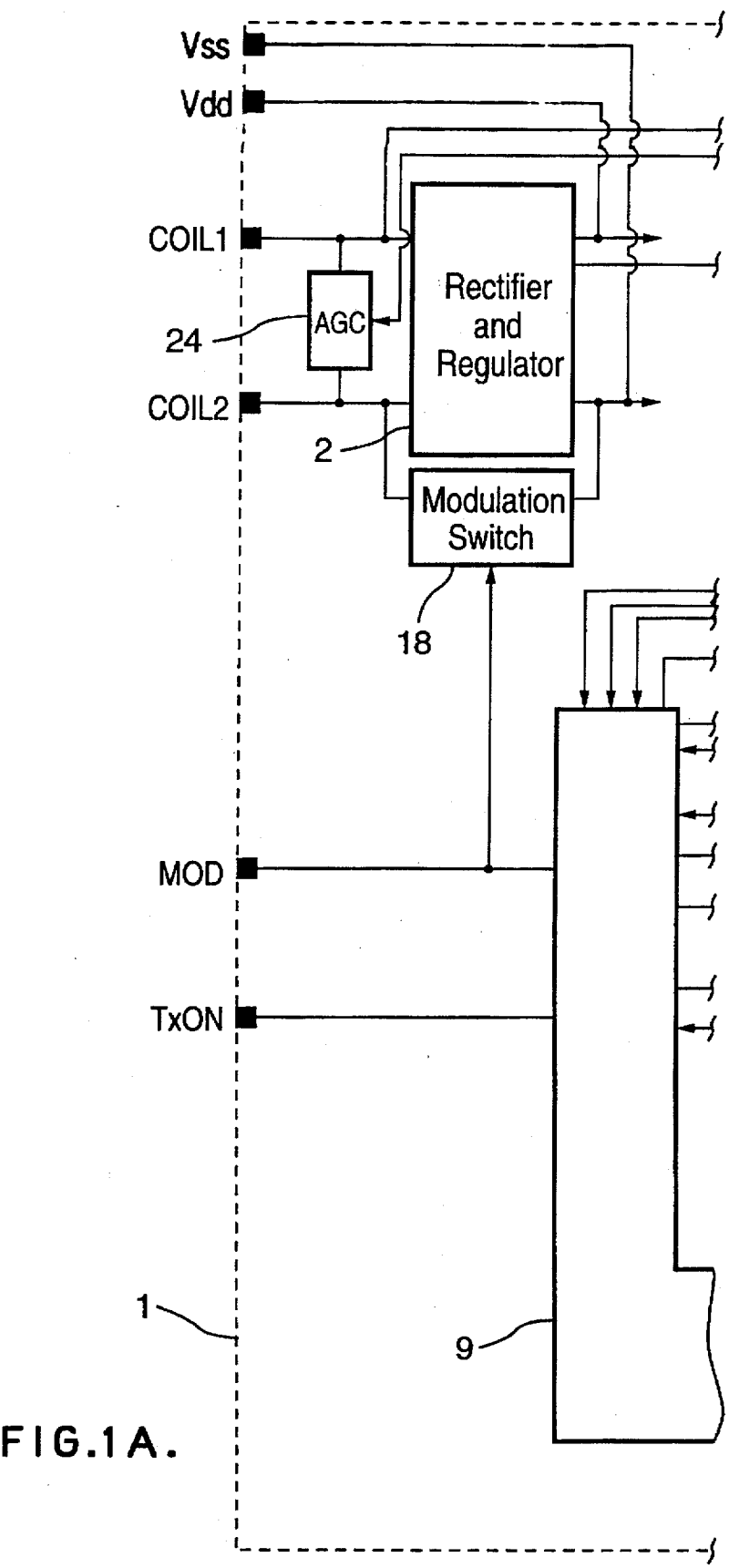
FIGS. 1a, 1b and 1c show a diagrammatic representation of a control circuit for the transponder.
Figure 1B:
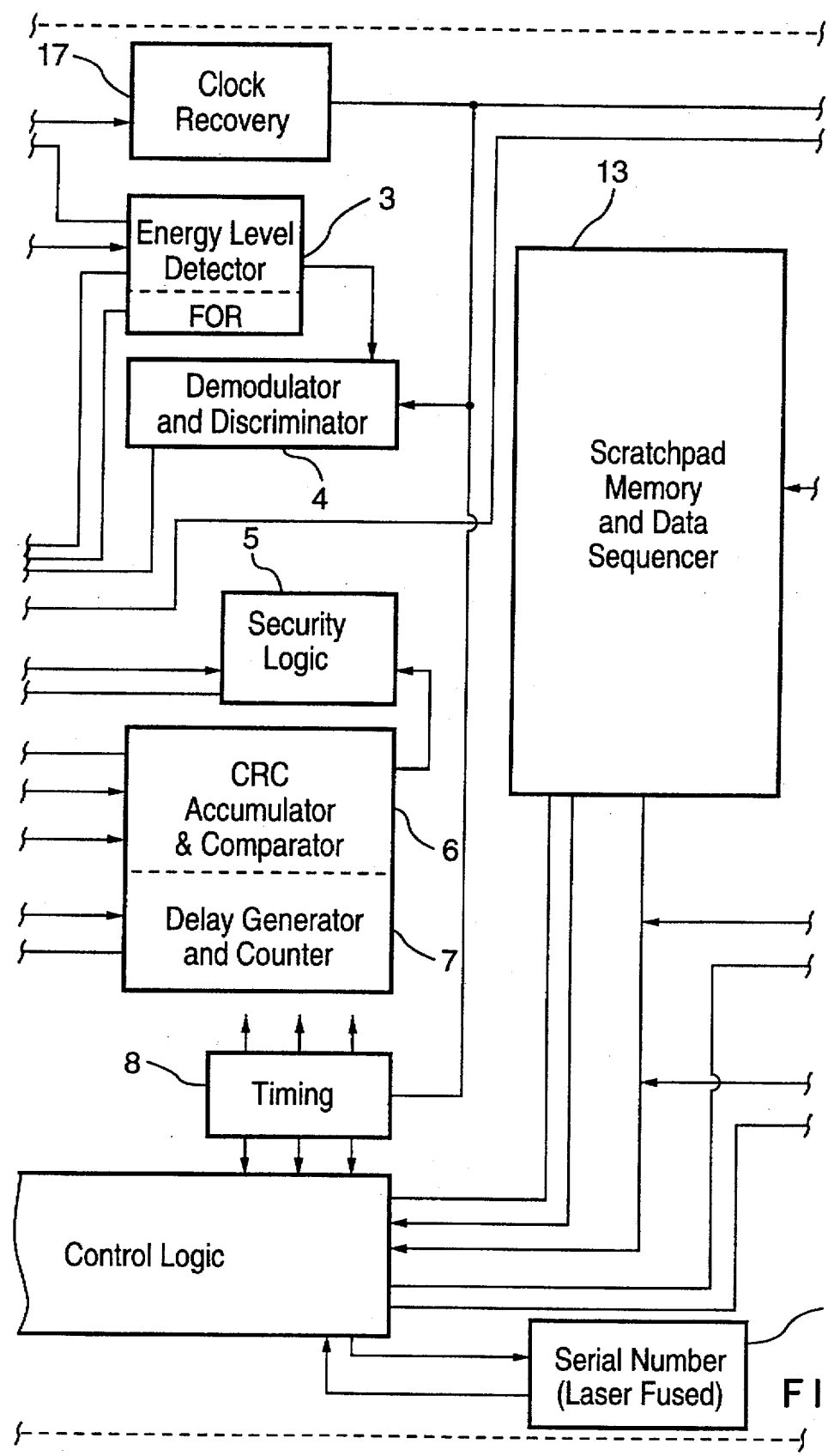
Figure 1C:
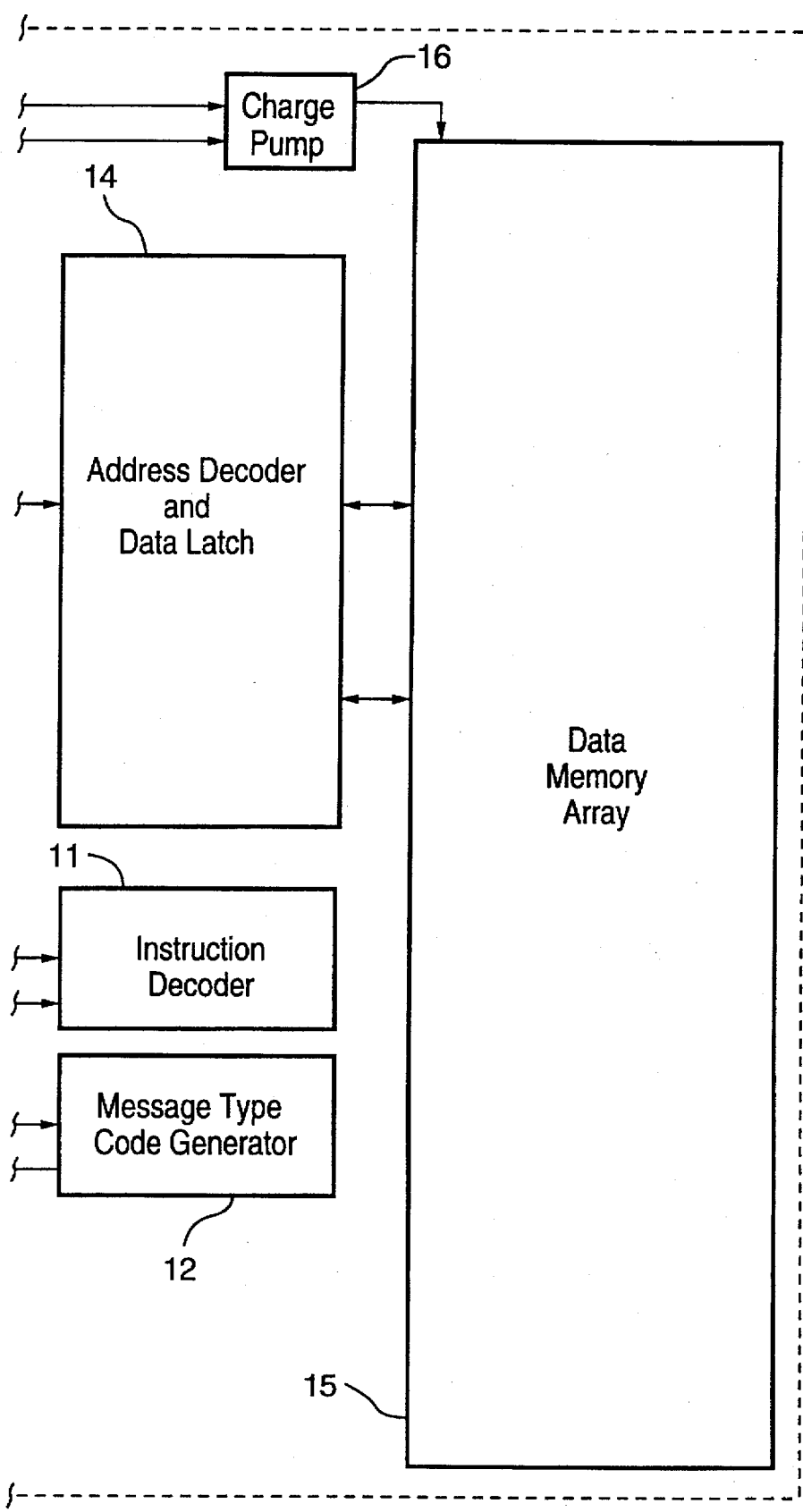

Referring first to FIGS. 1–1C, a substantially sinusoidal excitation signal from a reader (not shown) is detected by a tuned circuit (FIGS. 2 and 3) external to the integrated circuit (IC) 1 at input terminals COIL1 and COIL2. The construction and operation of such readers is well known in the art, and no further detailed description thereof is provided herein. The detected signal is passed to a bridge rectifier circuit 2 which acts to rectify and regulate the detected AC signal. Energy level detector circuit 3 serves to generate a power-on reset and other signals which indicate to control logic 9 whether there is sufficient energy for various operations. The operation of this detector circuit is described in detail herein below with reference to the programming operations associated with data memory array 15.

Clock recovery circuit 17 extracts the clock signal from the excitation signal, which is then used to derive timing signals for the remainder of control circuit 1, through timing generator-block 8. Demodulation of modulations in the excitation carrier signal are performed by demodulator and discriminator 4, which then presents the demodulated information to control logic 9 for processing. Security logic 5 acts to prevent unauthorized access to the transponder's data memory 15.

All messages transmitted to the transponder by a reader and all messages sent by a transponder to a reader include an error check field. CRC (Cyclic Redundancy Check) accumulator 6 serves to assess the integrity of received messages and dynamically compose the error check field which is appended to transmitted messages.

Control logic 9 is combinational logic which functions so as to govern the operation of the transponder in accordance with pre-defined operating sequences, as discussed in greater detail below. Delay generator 7 is used by control logic 9 to manager he simultaneous identification feature of the present invention.

Information received by a transponder contains an instruction field which is processed by instruction decoder 11 to determine what action is required by the transponder in response to each received message. In response to a received message, the transponder may generate a reply message which also contains a message type field and this is generated by a message type code generator 12 under control of control logic 9.

Data contained in a message received by the transponder is temporarily held in scratchpad memory 13 before it may be written to data memory array 15 via address decoder and latch 14. Data memory array 15 may, for example, be an array of CMOS E$^2$PROM cells, which requires a relatively higher voltage for writing than reading. This voltage is produced by charge pump 16. Scratchpad memory 13 also serves to queue data fetched from data memory array 15 via address decoder and latch 14 during a data fetch cycle.

During the identification cycle which is entered shortly after the transponder experiences an excitation signal from the reader, control logic 9 accesses a special fixed code area 10 which holds the transponder's serial number and other key information, without any need for control logic 9 to access data memory array 15, thus saving dynamic power.

Data and other information to be transmitted by the transponder is routed via control logic 9 to modulation switch 18, which functions to vary the current in the external tuned circuit (not shown) and thereby convey information and data to the reader.

Figure 2:
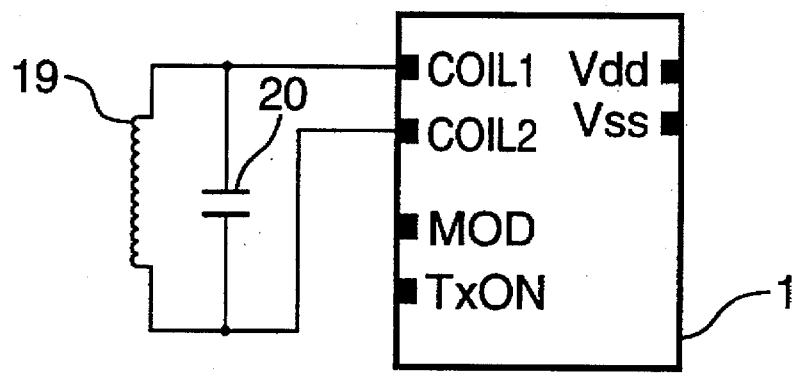
FIG. 2 illustrates how the control circuit shown in FIG. 1 may be incorporated in a field-powered transponder.

FIG. 2 shows a simple representation of an embodiment of the invention wherein control circuit 1 is employed in a field-powered transponder. In this configuration, the only power for operation is derived from the excitation field generated by the reader (not shown). Detector coil 19 and capacitor 20 form a parallel tuned circuit whose resonant frequency is equal to the frequency of the excitation signal generated by the reader.

Although tuning coil 19 and capacitor 20 are shown as discrete components and not as part of the IC 1, it is well known that such components can be fabricated on-chip, but this does not in any way affect the operation of the present invention.

The substantially sinusoidal signals transmitted by the reader and detected by the tuned circuit comprising detector coil 19 and capacitor 20 deliver a substantially sinusoidal signal to IC 1 at terminals COIL1 and COIL2. In this field-powered mode of operation, the transponder circuit comprising coil 19, capacitor 20 and control circuit 1 operates in the manner described in greater detail below, without need for any additional components or power source.

Figure 3:
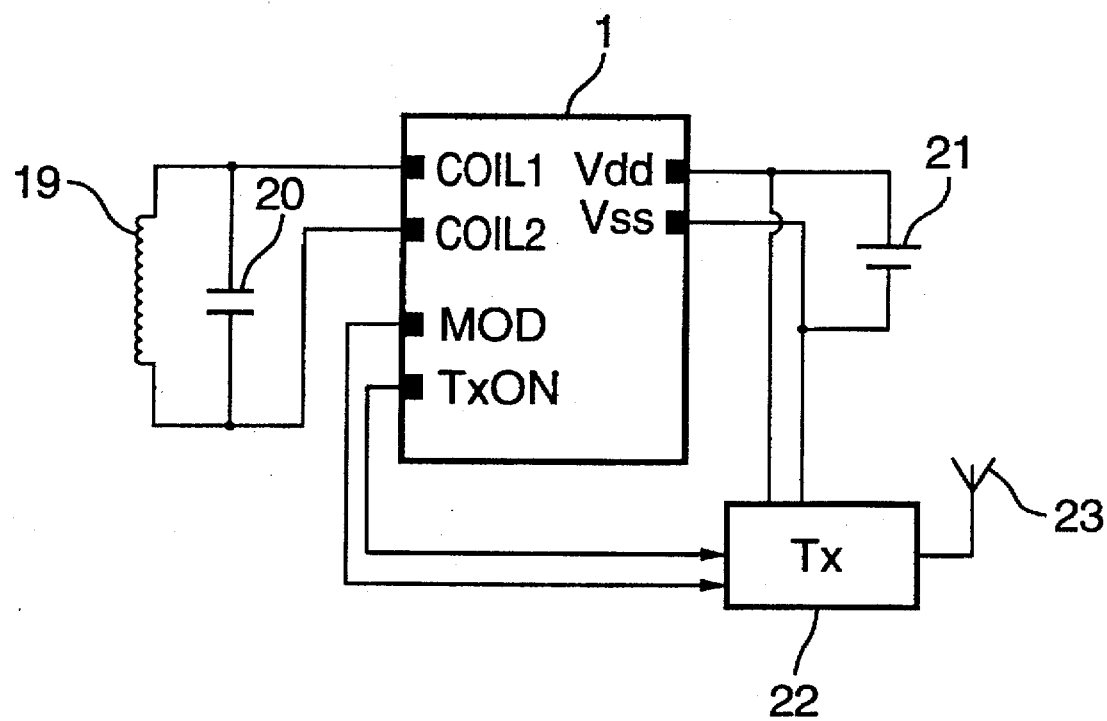
FIG. 3 illustrates how the control circuit shown in FIG. 1 may be incorporated in a self-powered transponder.

FIG. 3 shows a self-powered transponder, comprising detector coil 19 and tuning capacitor 20, which detects and delivers signals generated by a reader (not shown) to control circuit 1. The control circuit 1 is powered by primary cell 21, which may for example be a lithium manganese-dioxide chemistry cell capable of delivering a nominal terminal voltage of 3V.

Transmitter 22 is used by control circuit 1 to send response signals to the reader via antenna 23. Transmitter circuit 22 is controlled by control circuit 1 via two signals generated at output pins labelled TxON and MOD, which prompt the transmitter circuit to enter a power-up or power-down condition and provide a modulating signal for carrier modulation. It should be noted that the transmitter in this configuration of control circuit 1 is powered from cell 21 under control of IC 1 so that the power required by the transmitter is drawn from cell 21 rather than from the excitation field generated by the reader, as in the embodiment of FIG. 2. The design of the transmitter 22 is well known and conventional, and is capable of providing an identification system in accordance with application demands, without affecting the principles of operation of the present invention.

Figure 4:
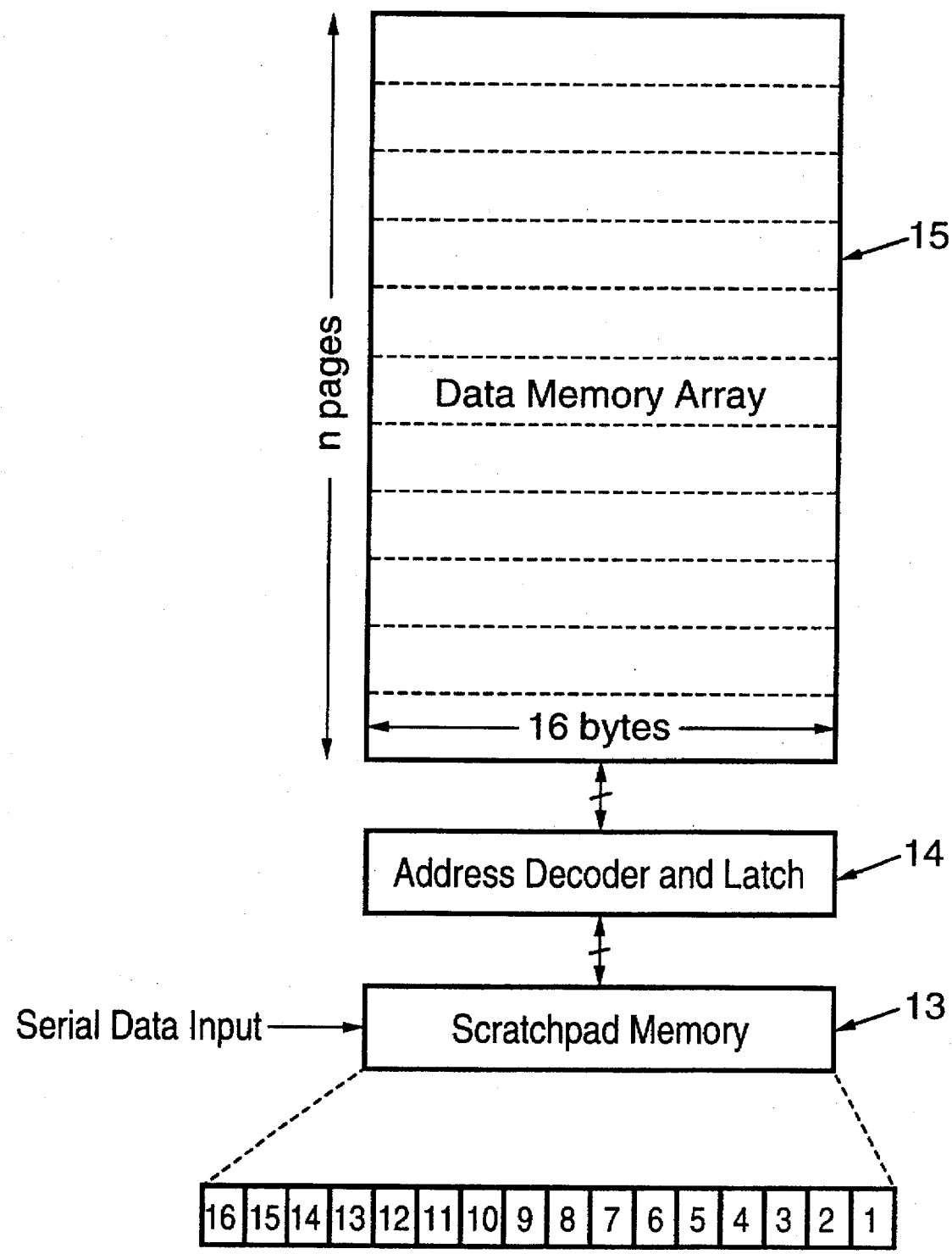
FIG. 4 shows a portion of the data memory and associated logic that provides parallel storage of several data bytes in order to minimise transaction time.

FIG. 4 shows a portion of data memory 15 and control logic 9 of control circuit 1, which provides parallel storage of a large number of data bytes. In this preferred embodiment of the present invention, data memory 15 has an architecture of 16 byte wide "pages" with a number "n" of such pages being stored in the data memory array. Data is received by the transponder bit-serially from the reader and is shifted into the scratchpad memory 13. Before data writing to data memory array 15 commences, 16 bytes of data are accumulated in scratchpad memory 13, assessed for errors by control logic 9 and CRC accumulator 6 (shown in FIGS. 1A–1C), and If the data is error free the data is then presented to data memory array 15 via address decoder and latch 14.

The time taken to store the accumulated 16 bytes of data in data memory array 15 is equal to the time that would be required to store just one byte in a prior art sequential storage system, so in practice the method disclosed herein produces a storage time per byte that is 1/16th of the time required to store 1 byte in a prior art sequential system.

The communications protocol between reader and transponder of the present invention accommodates block transfer of data so that once a 16 byte page of data has been sent to a transponder and determined to be error free following it s receipt, there is only one acknowledgement required for this block of 16 bytes, in contrast to prior art sequential systems which typically have an acknowledgment from transponder to reader following receipt of each individual data byte in a data packet.

Figure 5:
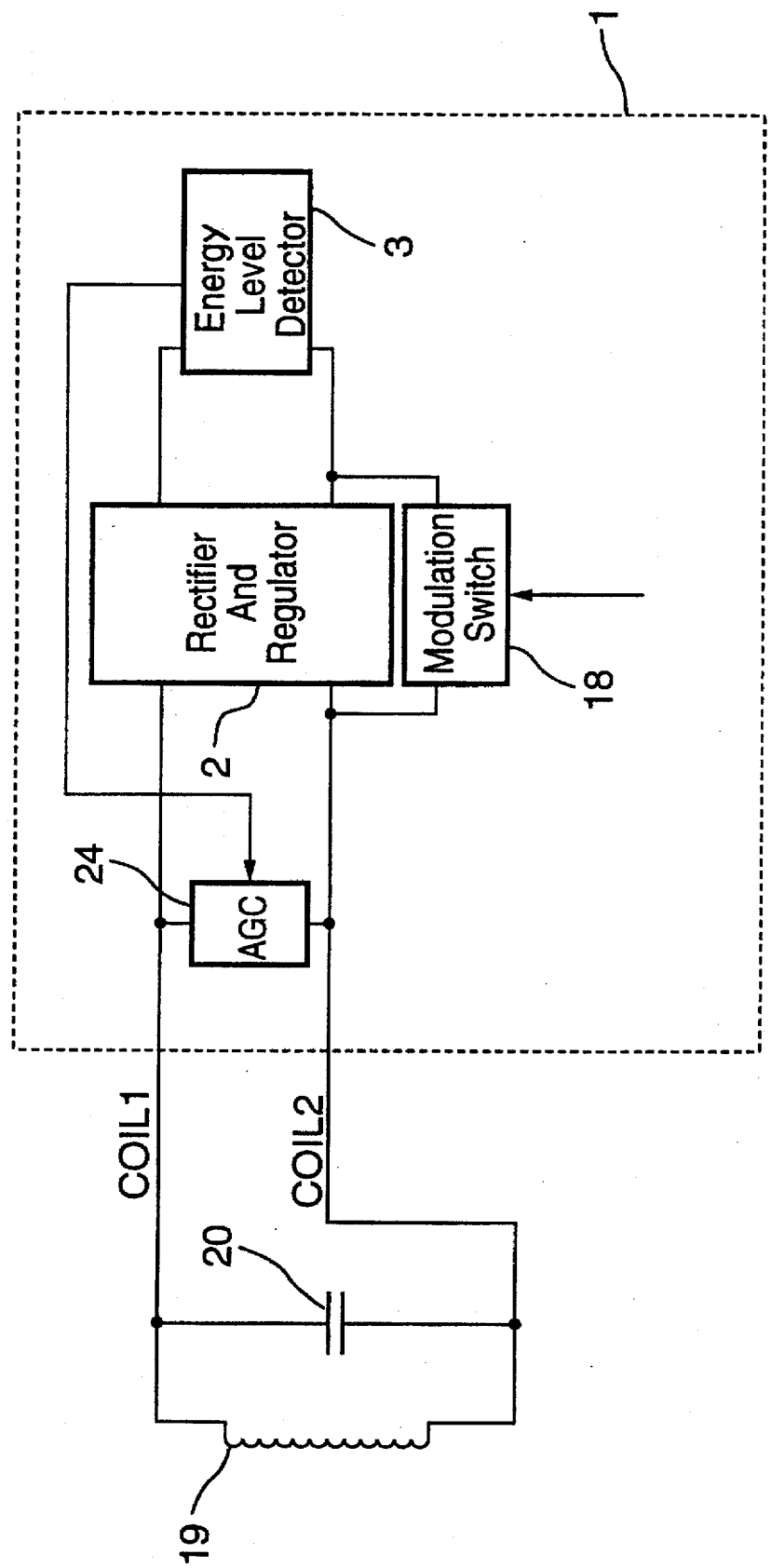
FIG. 5 shows a portion of the control circuit shown in FIGS. 1A–1C relating to automatic gain control (AGC).

FIG. 5 shows a portion of control circuit 1 (shown in full in FIGS. 1A–1C) for implementing the AGC function of the present invention for limiting the amount of signal extracted from the field generated by the reader and delivered to remainder of control circuit 1 for operation. AGC element 24 is essentially a voltage controlled resistance such as a field effect transistor (FET) which acts to progressively decrease the loaded Q of detector circuit coil 19 and capacitor 20.

Theory of Operation

The communications protocol of the present invention has been designed to accommodate robust exchanges of instructions and information bidirectionally between readers and transponders, and particular attention has been paid to the transaction process. To recap, a "transaction" is a sequence of message exchanges between the reader and a nominated transponder, followed by the reading of a portion of data from the transponder's data memory array 15, writing of some fresh information into the data memory array and obtaining a confirmation from the transponder that the prescribed data storage action has been completed. The novel method employed by the present invention follows three simple rules:

1. The reader sends a packet of data to the transponder for storage, including an error check field so that the transponder may make a self-assessment of the integrity of the received data packet using CRC accumulator and comparator 6 in FIGS. 1A–1C under control of control logic 9, prior to presenting this data to the memory array 15 for storage therein.

2. If the received message is error free, then no immediate response is given to the reader by the transponder, thereby minimizing the transaction time. Instead, data is transferred immediately to data memory array 15, and when storage is determined to be complete by control logic 9 in FIGS. 1A–1C, a confirmatory acknowledgement message is sent to the reader for reporting completion of the prescribed programming operation and the new contents of the destination page is fetched from data memory array 15 and transmitted as an element of the confirmatory message.

3. If however the received data message contains a detectable error, then the transponder immediately transmits a special message to the originating reader to indicate that a corrupted massage has been received, thereby implicitly requesting the reader to re-transmit the message packet.

In this way, the overall transaction time is minimised for an error free exchange, since time is not spent explicitly acknowledging receipt of an error free message. Rather, the transponder performs the prescribed data storage task and then reports completion of this operation, and a message which is determined to contain errors is treated as an exception.

The aspect of the present invention described above as "selective programming", is an important aspect in that it allows the transponder system of the present invention to meet the demands of application in AFC systems, or in other situations where more than one transponder may come under control of a reader at a particular time and it is desired that the reader can determine which particular transponder should receive a certain transmitted message packet. It has been stated herein that every transponder is given a unique serial number (stored in fixed code area 10), at the time manufacturing the control circuit 1. For reasons of security and other operational advantages described herein, this serial number is written to IC 1 using laser fusing techniques. It is this serial number which is used by the reader to indicate to any transponders under its control which transponder a particular message is intended for.

Furthermore, control circuit 1 is provided with special security logic circuitry 5 (FIGS. 1A–1C), which encrypts and decrypts the serial number portion of any message transmitted or received by a transponder. By a proprietary mechanism performed by security logic 5, when a transponder sends an identification or other message its unique serial number may be transmitted in an encrypted format. A reader receiving such a message must have knowledge of the encryption algorithm implemented by security logic 5 in order to be able to deduce and include the unique identification and memory access code particular to the originating transponder. Otherwise, the message packet is rejected and read or write access to the transponder data memory array 15 is denied. In this way, dual functions are provided of individually addressing a particular transponder for data reading and programming and providing an encryption mechanism which results in a write-access code that is unique to each transponder, which further acts to advantageously minimise communication message lengths and hence reduce transaction times.

It has been noted that for a field-powered transponder as shown in FIG. 2, control circuit 1 is able to make an assessment of the amount of energy available from the excitation field produced by a reader. This is determined by energy level detector 3 which provides signals to control logic 9 which can thereby make periodic assessment of the amount of energy available for different internal operations. For example, storing data in data memory array 15 when this is fabricated using CMOS $E^2PROM$ cells requires significantly greater power than when reading data therefrom.

Therefore, when control circuit 1 is requested to perform a data programming operation following receipt of an instruction and associated data packet from a reader, it makes an assessment of whether this operation can be performed given the amount of energy available from the excitation field. This is achieved by energy level detector 3 loading the supply voltage delivered to the majority of control circuit 1 by regulator 2 with a dynamic load representative of the load presented during actual writing to data memory array 15. The time taken to store information in memory array 15 is known, as is the power required to perform the data storage operation (ie. charge tunnelling in the case of CMOS $E^2PROM$). Hence, energy level detector circuit 3 can make a determination of the amount of energy required to conduct the data storage process.

If there is sufficient energy available, then control logic 9 manages the data writing operation in a predetermined manner. If there is insufficient energy control circuit 1 sends a message to the originating reader using the communications protocol described herein.

Furthermore, the aforementioned energy assessment technique provides the transponder with the facility to predict the successful outcome of a data writing operation even if the transponder's power source (the excitation signal generated by the reader) is suddenly removed immediately after the time energy assessment action is performed, since the assessment process is performed on the basis of energy stored in the transponder's energy storage device (not shown), which may, for example, be a capacitor and which may be an integral part of rectifier and regulator circuit 2 or connected to control circuit 1 via a signal input pin or terminal.

In the preferred application of the present invention in AFC systems, the "outcome prediction" capability is a particularly powerful facility since a passenger carrying the transponder and using it as an electronic ticket may pass the transponder through the excitation field generated by the reader so quickly that the reader has insufficient time to complete a transaction in situations where multiple pages of data are to be written to transponder. In the absence of the technique described herein, it would be possible that a page of data may not be properly stored if the transponder is suddenly removed from the excitation field during a data writing operation, resulting in consequential premature volatility of the data. The technique of outcome prediction described herein eliminates this potential problem and provides a system which features reliable data storage under such extreme conditions.

In practical installations of a transponder identification system, the distance between transponders and the reader's antenna for generating an electromagnetic excitation signal, is not fixed. Thus, the level of signal detected and extracted by a transponder will vary greatly as the transponder's position and orientation with respect to the driven antenna changes. AGC circuit 24 in FIG. 5 has been introduced in the present invention to give the transponder the greatest possible dynamic operating range.

Although not shown in detail, the AGC circuit 24 is preferably essentially a voltage controlled variable resistance element such as a field effect transistor (FET) which is designed to act so that when the level of signal detected by the transponder is below a predetermined threshold, the resistance approaches infinity and therefore presents negligible load to detector circuit coil 19 and tuning capacitor 20, resulting in the highest possible loaded Q for the detector circuit and hence the greatest efficiency. When the level of the signal is above this predetermined threshold, a variable control signal is applied to AGC element 24 which causes its resistance to progressively decrease, thereby presenting an increasing load to the tuned detector circuit which in turn serves to reduce its loaded Q and hence its efficiency as a detector.

This has the desirable effect of limiting the amount of signal available to the transponder irrespective of how close it is to the antenna of the reader which generates the electromagnetic field that excites and powers the transponder. This, in turn, means that the dynamic range of the transponder, and in particular its clock extraction circuit 17, is significantly increased in comparison with a transponder which does not incorporate such an AGC circuit.

In the field-powered application of control circuit 1 shown in FIG. 2, the control circuit 1 is described as functioning not only to receive the power and clocking signal via detector coil 19 and capacitor 20, but also to send signals from the transponder to the reader. However, the transponder circuit operates equally efficiently as a detector of signals originating from other-transponders which may be in the vicinity of the reader. Control circuit 1 incorporates circuitry for recognizing the modulation format associated with a transponder's transmission to the reader, and discriminator 4 and control logic 9 are arranged so as to be sensitive to such modulation patterns. In this way, a particular transponder may detect the near presence of other transponders when those other transponders are transmitting to the reader.

When a transponder first enters the excitation field generated by a reader, it initially determines whether there are any modulation patterns present in that field consistent with those which would be observed when a transponder is transmitting to the reader. Control circuit 1 is arranged to operate such that if it detects patterns which are determined to have originated from another transponder immediately after entering the excitation field, it "holds off" transmitting its identification message until the detected transmission is finished. This serves to enhance the simultaneous identification performance of the system and improve communications between reader and the transponders, and between the transponders and reader.

As discussed above, each transponder is provided with a unique serial number at the time of fabricating control circuit 1. This number is etched into the chip in special area 10 (FIGS. 1A–1C) using laser fusing techniques, and so presents a fixed code. This permanently stored identifier data is conceptually and logically separated from read/write data memory 15. Serial number area 10 is accessed by control logic 9 in a predetermined manner in order to complete the message transmission and reception operations defined in the communications protocol between transponder and reader. Control logic 9 is able to access serial number code area 10 without seeking access to data memory array 15 via functional blocks 13 and 14, which means that power consuming circuits 13 and 14 which are associated with accessing read/write data memory array 15, need not be enabled in order for the device to simply transmit an "identification only" message, comprising serial number, error check and framing fields. This results in a further minimisation of overall dynamic power consumption and hence increased range in the identification mode.

By reference to the preceding description of a preferred embodiment of the present invention and to the accompanying drawings, it would be a straightforward exercise for one skilled in the art of silicon integrated circuit design to devise the detailed logic and analogue circuit elements required for the various functional blocks shown in FIGS. 1A–1C to implement the functionality herein described and claimed.

The preferred embodiment herein described and depicted is given byway of practical example only, and it will be readily appreciated to one skilled in the art of designing transponder systems that there can be many possible variations in implementation of such a transponder which permit fabrication of devices that retain close adherence to the operating principles described and claimed herein.

We claim:

1. In a radio frequency transponder system including an input for receiving a radio frequency signal modulated with data, said data including an error check field, a circuit for demodulating said signal so as to recover said data in serial format, and data memory for storing said data, the improvement comprising a first circuit for receiving said data in serial format and converting said data to parallel format, a second circuit for assessing any errors in said data with reference to said error check field and in the event said data is free of errors then storing said data in parallel format in said memory as a succession of pages each comprising one or more bytes of said data.

2. The improvement of claim 1, wherein said first circuit comprises a scratchpad memory for bit-serially receiving and accumulating said data to form a page of said data for parallel storage in said data memory.

3. The improvement of claim 1, wherein said second circuit comprises control and error check logic for performing a cyclic redundancy check on said error check field for assessing any said errors in said data, and an address decoder and latch for storing said data in said data memory.

4. A method of transferring data from a reader to at least one transponder in a communication system, comprising the steps of:

a) transmitting a packet of said data from said reader to said transponder, wherein said data includes an error check field;

b) assessing within said transponder whether said data contains any errors with reference to said error check field;

c) in the event said data is free of errors then storing said data in said transponder and transmitting an acknowledgement message from said transponder to said reader for reporting completion of said storing of said data; and d) in the event said data contains an error then transmitting a predetermined message from said transponder to said reader for indicating that said data has been corrupted, thereby initiating re-transmission of said packet of data from said reader to said transponder.

5. In a radio frequency transponder for receiving data from a reader, said data including an address for identifying said transponder from among a plurality of transponders, the improvement comprising a fixed code area in said transponder for storing a unique identification number for said transponder, and logic circuitry for comparing said address included in said data received from said reader with said identification number so as to thereby ascertain whether said data is intended for said transponder from among said of transponders.

6. The improvement of claim 5, wherein said unique identification number is stored in said fixed code area of said transponder via laser fusing.

7. The improvement of claim 6, wherein said address is encrypted and wherein said transponder further includes security logic circuitry for decrypting said address and encrypting said identification number.

8. In a passive transponder system for receiving a radio frequency signal modulated with programming instruction data from a reader, deriving operating power from said radio frequency signal, demodulating said programming instruction data from said radio frequency signal and in response effecting internal re-programming, the improvement comprising:

a) an energy level detector for detecting energy available in said radio frequency signal; and b) control connected to said energy level detector for determining whether sufficient energy is available in said radio frequency signal to effect said re-programming in accordance with said programming instruction data, and in the event sufficient energy is available then effecting said re-programming, and in the event that insufficient energy is available then transmitting a message to said reader for notifying the reader that re-programming cannot be effected.

9. In a passive transponder system having an antenna for receiving a radio frequency signal modulated with data a reader, circuitry for deriving operating power from said radio frequency signal, and further circuitry for demodulating said data from said radio frequency signal, the improvement comprising:

a) an energy level detector for detecting energy available in said radio frequency signal; and b) an automatic gain circuit connected to said energy level detector and said antenna for varying load resistance to said antenna by increasing said resistance when said energy available is less than a predetermined amount, and decreasing said resistance when said energy available is greater than said predetermined amount, thereby dynamically varying loaded quality factor (Q) of said transponder relative to distance between said reader and said transponder so as to provide a wide dynamic operating range of said transponder.

10. A communication system comprising:

a) a reader for generating a radio frequency excitation field;

b) a plurality of radio frequency transponders, each of said transponders being capable of transmitting a message to said reader immediately upon detecting said excitation field; and c) circuitry within each of said transponders for detecting transmission of messages to said reader by other ones of said transponders and in response delaying transmission of said message to said reader by a predetermined time period, thereby avoiding interference between said plurality of transponders.

* * * * *